(12) United States Patent
Maleev et al.

(10) Patent No.: US 11,385,154 B2
(45) Date of Patent: Jul. 12, 2022

(54) APPARATUS AND METHOD FOR MONITORING AND MEASURING PROPERTIES OF POLYMERS IN SOLUTIONS

(71) Applicant: Tokyo Electron Limited, Tokyo (JP)

(72) Inventors: Ivan Maleev, Fremont, CA (US); Ching Ling Meng, Fremont, CA (US)

(73) Assignee: Tokyo Electron Limited, Tokyo (JP)

( * ) Notice: Subject to any disclaimer, the term of this patent is extended or adjusted under 35 U.S.C. 154(b) by 120 days.

(21) Appl. No.: 17/034,724

(22) Filed: Sep. 28, 2020

(65) Prior Publication Data

US 2022/0099545 A1    Mar. 31, 2022

(51) Int. Cl.
*G01N 15/02* (2006.01)
*G01G 9/00* (2006.01)
*G01N 15/06* (2006.01)
*G01N 21/41* (2006.01)

(52) U.S. Cl.
CPC ........... *G01N 15/0205* (2013.01); *G01G 9/00* (2013.01); *G01N 15/06* (2013.01); *G01N 21/41* (2013.01); *G01N 2015/0693* (2013.01)

(58) Field of Classification Search
CPC ..... G01N 15/0205; G01N 15/06; G01N 21/14
See application file for complete search history.

(56) References Cited

U.S. PATENT DOCUMENTS

| | | | | |
|---|---|---|---|---|
| 4,715,708 A | * | 12/1987 | Ito | G01N 15/1434 250/222.2 |
| 6,975,392 B2 | | 12/2005 | Larkin | |
| 7,027,138 B2 | * | 4/2006 | Larkin | G01N 21/4133 356/73 |
| 7,495,754 B2 | * | 2/2009 | Nakamura | G01N 21/4133 356/130 |
| 7,724,356 B2 | | 5/2010 | Tokieda | |

(Continued)

FOREIGN PATENT DOCUMENTS

| | | |
|---|---|---|
| EP | 3 023 770 A1 | 5/2016 |
| WO | WO 2020/078574 A1 | 4/2020 |

OTHER PUBLICATIONS

Alan Patterson ; Bad Photoresist Costs TSMC $550 Million ; EEITimes ; https://www.eetimes.com/designline/soc-designline/ ; Feb. 19, 2019 ; 2 Pages.

(Continued)

*Primary Examiner* — Rebecca C Bryant
(74) *Attorney, Agent, or Firm* — Oblon, McClelland, Maier & Neustadt, L.L.P.

(57) ABSTRACT

Techniques herein include an apparatus and method for measuring and monitoring properties of fluids consumed in a semiconductor fabrication process. The apparatus includes a flow cell having a hollow chamber, a first chamber sidewall of the hollow chamber bisecting the length of the flow cell, the first chamber sidewall having a predetermined angle to the incoming direction of light from the first light source; a refractive index sensor configured to detect the light from the first light source transmitted through the hollow chamber of the flow cell and exiting the flow cell through the second flow cell sidewall of the at least six flow cell sidewalls; and a first light sensor configured to detect the light from the first light source scattered off the fluid in the hollow chamber.

20 Claims, 6 Drawing Sheets

(56) References Cited

U.S. PATENT DOCUMENTS

| | | | |
|---|---|---|---|
| 10,139,344 B2 | 11/2018 | Kovriguine | |
| 10,352,841 B2 | 7/2019 | Moitzi | |
| 11,041,804 B2* | 6/2021 | Oda | G01N 21/4133 |
| 2003/0096199 A1* | 5/2003 | Nakagawa | G03F 7/3021 |
| | | | 430/327 |
| 2005/0168726 A1 | 8/2005 | Larkin et al. | |
| 2005/0168733 A1* | 8/2005 | Larkin | G01N 21/4133 |
| | | | 356/246 |
| 2009/0079968 A1 | 3/2009 | Tokieda | |
| 2017/0315057 A1 | 11/2017 | Kovriguine | |
| 2018/0313737 A1 | 11/2018 | Moitzi | |
| 2021/0262994 A1 | 8/2021 | Ortin Sebastian et al. | |

OTHER PUBLICATIONS

McCoy; TSMC increases estimate of hit from a bad photoresist ; Chemical & Engineering News, vol. 97, Issue 8 ; Feb. 3, 2019 ; 2 Pages.
TEL ; Coater/Developer LITHIUS™ series ; https://www.tel.com/product/lithius.html ; Product; 5 Pages.
Berne, et al. ; Dynamic Light Scattering, with Applications to Chemistry, Biology, and Physics ; Journal of Chemical Education , p. 1.
International Search Report and Written Opinion dated Nov. 10, 2021 in PCT/US2021/043729, 9 pages.

* cited by examiner

APPARATUS AND METHOD FOR MONITORING AND MEASURING PROPERTIES OF POLYMERS IN SOLUTIONS

FIELD OF THE INVENTION

The present disclosure relates to an apparatus and method of monitoring and measuring key properties of typical compounds used in semiconductor manufacturing processes.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The semiconductor wafer manufacturing process can involve depositing various types of liquid solutions on wafer substrates to form films with desired properties for downstream processing, such as device fabrication. Examples include photoresists, anti-reflective hard masks, and spin-on carbon. Once the liquid solution including a solvent is deposited, the solvent is allowed to evaporate, and the dissolved material in the solvent forms into the film. It is advantageous to ensure that the dissolved material concentration in the liquid solution is within a predetermined range and tolerance, and that the materials themselves have appropriate physical and chemical properties. Example properties include molecular size, molecular weight, viscosity, diffusion coefficient, etc. In the event the liquid solution does not have optimal properties, for example a degraded photoresist, a single batch of bad photoresist may result in high financial costs and delayed product delivery for a manufacturer. As such, a method and apparatus to monitor and measure for said degradation of the liquid solutions is desired.

SUMMARY

The present disclosure relates to an apparatus for measuring properties of polymer molecules in a fluid, comprising: a flow cell, including at least six flow cell sidewalls arranged in a cuboid shape and configured to receive light from a first light source through a first flow cell sidewall of the at least six flow cell sidewalls, the light from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light from the first light source having a first predetermined wavelength; an inlet for receiving the fluid; an outlet for expelling the fluid; and a hollow chamber fluidly coupled to the inlet and the outlet, a first chamber sidewall bisecting the length of the flow cell, the first chamber sidewall having a predetermined angle to the incoming direction of light from the first light source; a refractive index sensor configured to detect the light from the first light source transmitted through the hollow chamber of the flow cell and exiting the flow cell through the second flow cell sidewall of the at least six flow cell sidewalls; a first light sensor configured to detect the light from the first light source scattered off the fluid in the hollow chamber; and processing circuitry electrically connected to the refractive index and first light sensors.

The present disclosure additionally relates to a method for measuring properties of polymer molecules in a fluid, comprising: irradiating the fluid flowing through a flow cell with light, the flow cell including at least six flow cell sidewalls arranged in a cuboid shape and configured to receive light from a first light source through a first flow cell sidewall of the at least six flow cell sidewalls, the light from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light from the first light source having a first predetermined wavelength, an inlet for receiving the fluid, an outlet for expelling the fluid, and a hollow chamber fluidly coupled to the inlet and the outlet, a first chamber sidewall bisecting the length of the flow cell, the first chamber sidewall having a predetermined angle to the incoming direction of light from the first light source; determining, via processing circuitry and a refractive index sensor configured to detect the light from the first light source transmitted through the hollow chamber of the flow cell and exiting the flow cell through the second flow cell sidewall of the at least six flow cell sidewalls, a concentration of a polymer in a solvent of the fluid, the fluid including a mixture of the polymer having a refractive index and the solvent having a refractive index; and determining, via the processing circuitry and a first light sensor configured to detect the light from the first light source scattered off the fluid in the hollow chamber, a particle size of polymer molecules in the fluid.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1A:
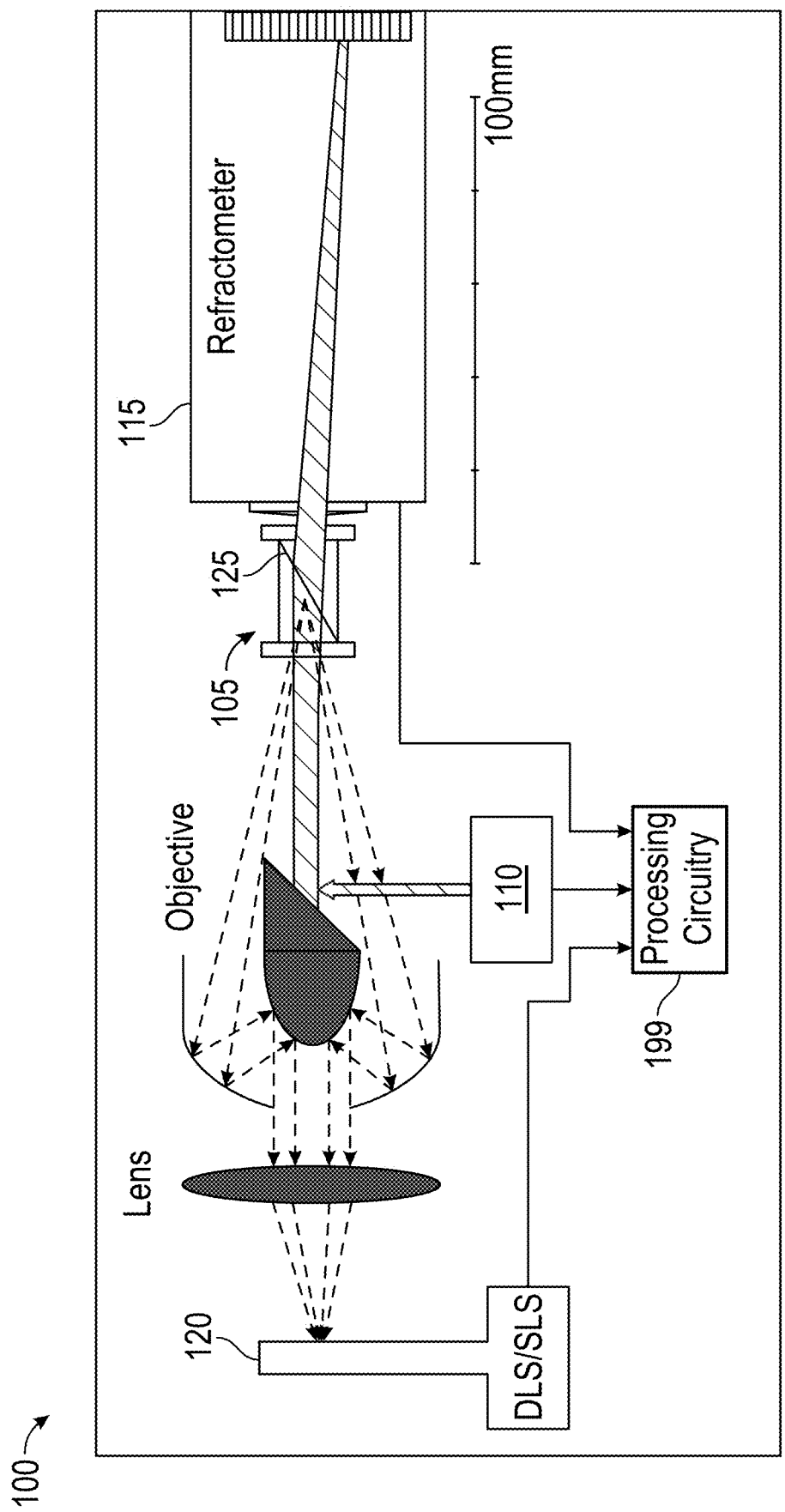
FIG. 1A is a schematic of a fluid monitoring apparatus, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Techniques herein include methods and apparatuses for tracking desired properties of common chemicals in liquid solutions used in a semiconductor manufacturing process. The fluid monitoring apparatus can include inline optical sensors utilizing a prismatic flow cell integrated with a liquid solution delivery subsystem, such as a spin coater and developer. The optical sensors can include a dynamic light scattering channel, a static light scattering channel, and a refractive index channel. The optical sensors can be configured to detect one or more of physical properties, chemical properties, or a combination thereof, of the substances that comprise solutions used for coating semiconductor wafers. These substances can include, but are not limited to, photoresists, spin-on dielectric, developer, etchant, cleaning fluid, and anti-reflective coating compounds. The optical sensors can be configured to detect changes in the composition and the one or more properties of the solution substances before they are consumed by the coating tool and applied on the semiconductor wafers. In one embodiment, the optical sensors of the fluid monitoring apparatus may be utilized for tracking composition and concentration of polymer molecules in a solvent, such as propylene glycol monomethyl ether acetate (PGMEA). It may be appreciated that the term composition can refer to the distribution of polymer molecular weight, size, shape, and other relevant properties.

In brief, the dynamic light scattering (DLS) channel can be used for measurements of the polymer molecule hydrodynamic radius distribution, including average radius and spread of the distribution. A combination of the DLS and the static light scattering (SLS) channels can be used for measuring polymer molecule weight distribution, including average molecular weight and spread of the distribution. Notably, the DLS and the SLS channels can share a same sensor. The refractive index channel can be used for measuring concentration of the polymer molecules in the solvent of the solution. In addition, the monitoring apparatus can include additional complimentary channels for measuring viscosity, density, electrophoretic mobility, and electrokinetic potential, among others.

FIG. 1A is a schematic of a fluid monitoring apparatus 100, according to an embodiment of the present disclosure. In an embodiment, the fluid monitoring apparatus 100 includes a flow cell 105, a light source 110, a refractive index sensor 115, a first light sensor 120, and processing circuitry 199. Notably, the first light sensor 120 can combine the measurements and monitoring for DLS and SLS.

Figure 1B:
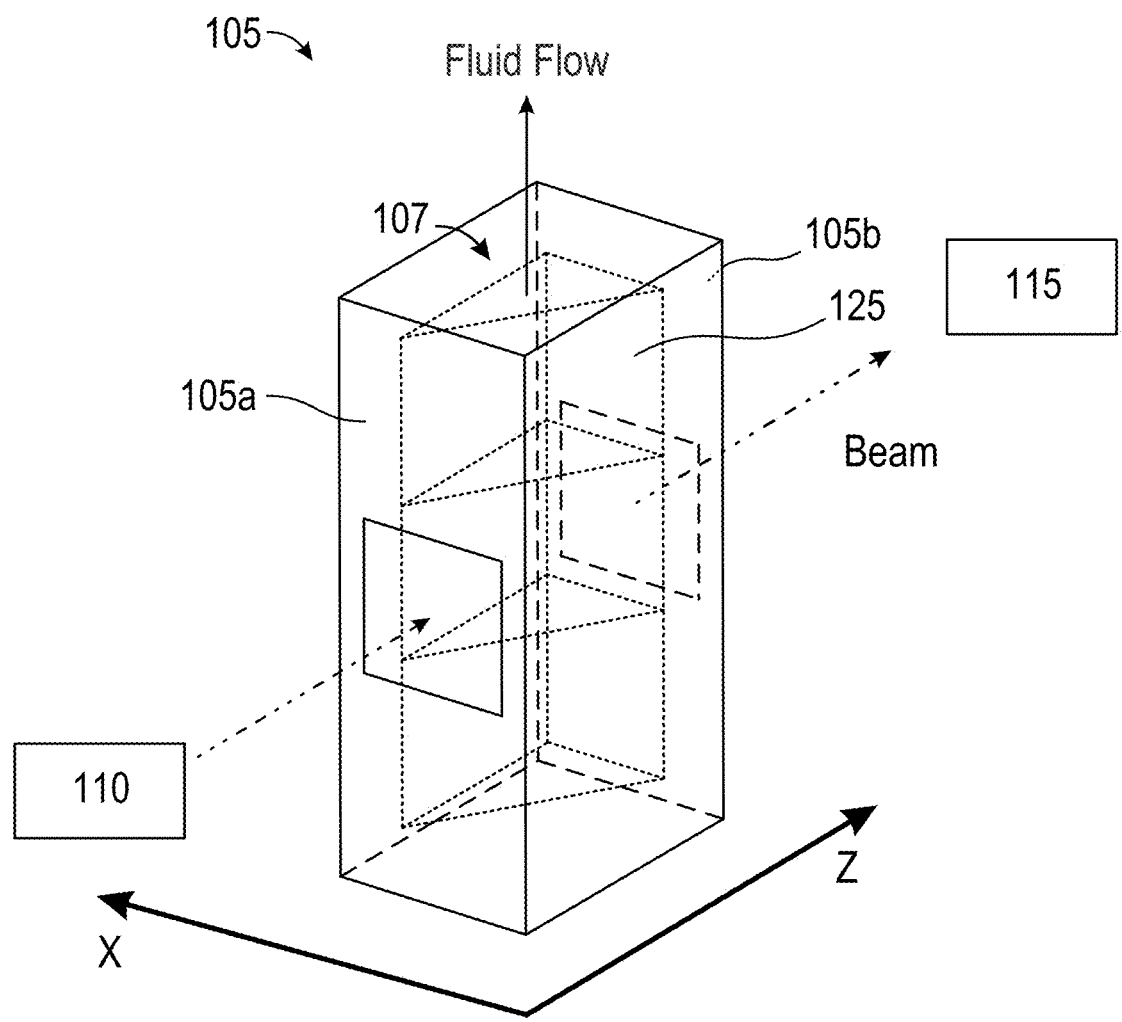
FIG. 1B is a schematic of a flow cell, according to an embodiment of the present disclosure.

FIG. 1B is a schematic of the flow cell 105, according to an embodiment of the present disclosure. In an embodiment, the flow cell 105 includes at least six flow cell sidewalls arranged in a cuboid shape and configured to receive light from the light source 110 through a first flow cell sidewall 105*a* of the at least six flow cell 105 sidewalls. For example, the light can be received at an angle between 60° and 120°, or between 75° and 105°, or between 85° and 95°, or a substantially orthogonal angle. The at least six flow cell sidewalls can be optically polished and can include an anti-reflective coating to minimize light loss, scatter, and multiple reflections. The light from the light source 110 can exit the flow cell 105 through a second flow cell sidewall 105*b* of the at least six flow cell sidewalls, wherein the second flow cell sidewall 105*b* of the at least six flow cell sidewalls can be disposed opposite and parallel to the first flow cell sidewall 105*a* of the at least six flow cell sidewalls. The flow cell 105 can include an inlet for receiving the fluid and an outlet for expelling the fluid. A hollow chamber 107 can be fluidly coupled to the inlet and the outlet, wherein the fluid flows from the inlet, through the hollow chamber 107, and exits via the outlet. It may be appreciated that reversing the direction of the flow of the fluid would then switch the function of the inlet to that of the outlet, and similarly, the function of the outlet to that of the inlet. The inlet and the outlet can be disposed anywhere on the flow cell 105 in order to allow fluid flow, but preferably, disposed at opposite ends of the flow cell 105 in order to minimize bends or turns in the pathway from the inlet to the outlet. This may allow for reduction of turbulence or chatter in the fluid flow, thereby improving measurements taken from the fluid. It may be appreciated that more than one of the inlet and/or more than one of the outlet can be implemented in the design of the flow cell 105 to regulate and improve flow of the fluid.

In an embodiment, the hollow chamber 107 includes a first chamber sidewall 125 bisecting a length of the flow cell 105. The length in this example can be along the direction of flow from the inlet to the outlet, preferably in an elongated flow cell 105 (as shown in FIG. 1B). The first chamber sidewall 125 can bisect the length of the flow cell 105 at a predetermined angle relative to the incoming direction of light from the light source 110. Thus, the first chamber sidewall 125 can be configured to scatter a first portion of the light while transmitting a second portion of the light through. This is described further below. A range of the predetermined angle for the bisecting first chamber sidewall 125 can be between, for example, 17° to 75°, or 20° to 60°, or preferably, 25° to 50°. Notably, the predetermined angle can be selected to avoid total internal reflections and to maximize the excursion of the beam on the refractive index sensor 115. Notably, the arrangement shown in FIG. 1B with the light entering the flow cell 105 through surface 105*a* may be preferred if the index of refraction of a sample is larger than the index of refraction of a material for the flow cell 105. However, in the case where the index of refraction of the sample is smaller than the index of refraction of flow cell 105 material, then in an embodiment, the light can enter the flow cell 105 in the opposite direction, e.g. through surface 105b, to avoid total internal reflection at sidewall 125.

In an embodiment, the light from the light source 110 can have a predetermined peak wavelength and a peak wavelength bandwidth. The peak wavelength bandwidth can be measured as, for example, a full-width half-maximum of the peak wavelength. In one example, the light from the light source 110 can be selected such that a broad range of wavelengths illuminate a fluid flowing through the flow cell 105. That is, the light can be broadband light, for example white visible light. In one example, the light from the light source 110 can be selected such that a narrow range of wavelengths illuminate the fluid. That is, the light can be narrowband light, for example LASER light having a desired peak wavelength and the peak wavelength bandwidth can be less than 50 nm. Other non-limiting examples for the light source 110 include at least one of LED, fiber-based tunable laser, tungsten halogen, deuterium, xenon, argon, mercury bulb, and LDLS (laser-driven light source)

In an embodiment, the light from the light source 110 can be directed from the flow cell 105 to the refractive index sensor 115 and the first light sensor 120 for simultaneous monitoring of the fluid. The monitoring apparatus 100 can be included as part of an integrated semiconductor processing module, for example a TEL CLEAN TRACK product line including a spin-coater module, an exposure module, a developer module, an etching module, and an atomic layer deposition module, among others. The processing module can be configured to flow the fluid, for example a photoresist, through the flow cell 105 prior to being deposited as a film on a semiconductor wafer via the spin-coater module. Notably, the quality of the photoresist can determine the spin-coated film uniformity and ability for subsequent features to be patterned using the film. This is especially true for applications using multiple depositions to form multilayer films. Therefore, any degradation of the photoresist can result in wasted semiconductor wafers and processing time. The sample used for monitoring can then be recycled back into the flow or discarded.

Furthermore, the flow cell 105 can allow for the simultaneous monitoring due to its design, and therefore reduce waste of any samples. That is, separate samples need not be collected for measurements via separate optical sensors for refractive index, DLS, and SLS. Instead, a single sample can be collected and all measurements taken from the single sample. It can be appreciated by those in the art that the cost of semiconductor processing materials, such as photoresists (particularly for extreme UV (EUV) applications), can be extremely cost-intensive and it is highly desirable to conserve or recycle as much of this resource as possible. However, recycling or re-using already consumed photoresist can be challenging due to the need for high purity.

Thus, the monitoring apparatus 100 can be configured to detect any quality issues in the fluid, wherein the fluid includes a polymer in a solvent. This can include, but is not limited to, aggregates of molecules of the polymer in the fluid, impurities in the fluid, and incorrect concentration (e.g. not enough/too many molecules of the polymer, or the solvent), among others. In an embodiment, the monitoring apparatus 100 can determine concentration of the polymer molecules in the solvent via the refractive index sensor 115.

The monitoring apparatus 100 can determine a polymer molecule hydrodynamic radius distribution, including average radius (or more generally, a particle size) and spread of the distribution of the polymer molecules in the solvent via the first light sensor 120. The monitoring apparatus 100 can also determine a polymer molecule weight distribution, including average molecular weight and spread of the distribution via the first light sensor 120 when the first light sensor 120 includes a combined DLS and SLS sensor.

In a preferred embodiment, the light source 110 directs the light to a first prism mounted on an obscuration aperture of a reflective objective, which may be of Schwartzchild's type, as shown schematically on FIG. 1A. As shown, the light that is subsequently back-scattered off the fluid flowing through the flow cell 105 can be collected by the first light sensor 120. Upon scattering from the first prism, the light can impinge upon the flow cell 105. In the preferred embodiment, the light impinges upon the flow cell 105 along the z-axis direction (as shown in FIG. 1B), travels through the first chamber sidewall 125, exits the flow cell 105, and proceeds to impinge on a line sensor or a position sensor of the refractive index sensor 115. Based on the index of refraction of the fluid, the transmitted beam will be deviated along the x-axis direction (as shown in FIG. 1B). For best resolution, the light source 110 can be configured to create a refracted line or a refracted spot in a plane of the refractive index sensor 115.

Notably, the prismatic internal shape of the flow cell 105, i.e. the first chamber sidewall 125, can be utilized in combination with the refractive index of the fluid to determine the concentration of the polymer in the solvent. Substantially, the material of the flow cell 105 can be selected such that its index of refraction is approximately in the middle of a range of indices of refraction of the fluids under monitoring and measurement. That is, a material of the flow cell has a refractive index and the flow cell material refractive index is similar to that of the refractive index of the fluid. For typical semiconductor solvents and chemicals or polymers, that range can be, for example, 1.40 to 1.50 for 650 nm light. For this example range, the material for the flow cell 105 can be, for example, fused silica or quartz, or a material having a refractive index in a range of 1.35 to 1.50. In essence, this can allow the flow cell 105 itself to act as a differential refractometer when the difference in refractive index between the flow cell 105 and the fluid causes the transmitted beam of light to deviate at an angle when exiting the flow cell 105, which is measured using the refractive index sensor. That is, due to a refractive index mismatch as the light travels from the flow cell to the fluid, the difference in optical density of the two materials causes the light path to change. This deviation can be used to calculate the concentration of the fluid and determine a quality level of the fluid based on the concentration (described further herein below). Upon determining the quality level is equal to or above a predetermined threshold and meets the desired standards, the fluid can be cleared for usage in the fabrication process. Upon determining the quality level is below a predetermined threshold and does not meet the desired standards, the fluid can be flagged for removal and the fabrication process can be stopped until a new fluid is loaded that meets the desired standards.

In an embodiment, the light from the light source 110 can be split and a portion of the light is impinged on the flow cell 105 along the z-axis direction, with a remainder of the light is redirected to impinge on the flow cell 105 along an orthogonal direction (the x-axis direction, as shown) to minimize the interference between the two beams and provide a dedicated beam for the measurements using the first light sensor 120. In such a configuration, the sidewalls of the at least six sidewalls of the flow cell upon which the light impinges are orthogonal to one another. In an embodiment, an additional light source can be included in the monitoring apparatus 100 instead of splitting the light and the additional light source can be configured to emit light along the orthogonal direction relative to the light from the light source 110.

Figure 2A:
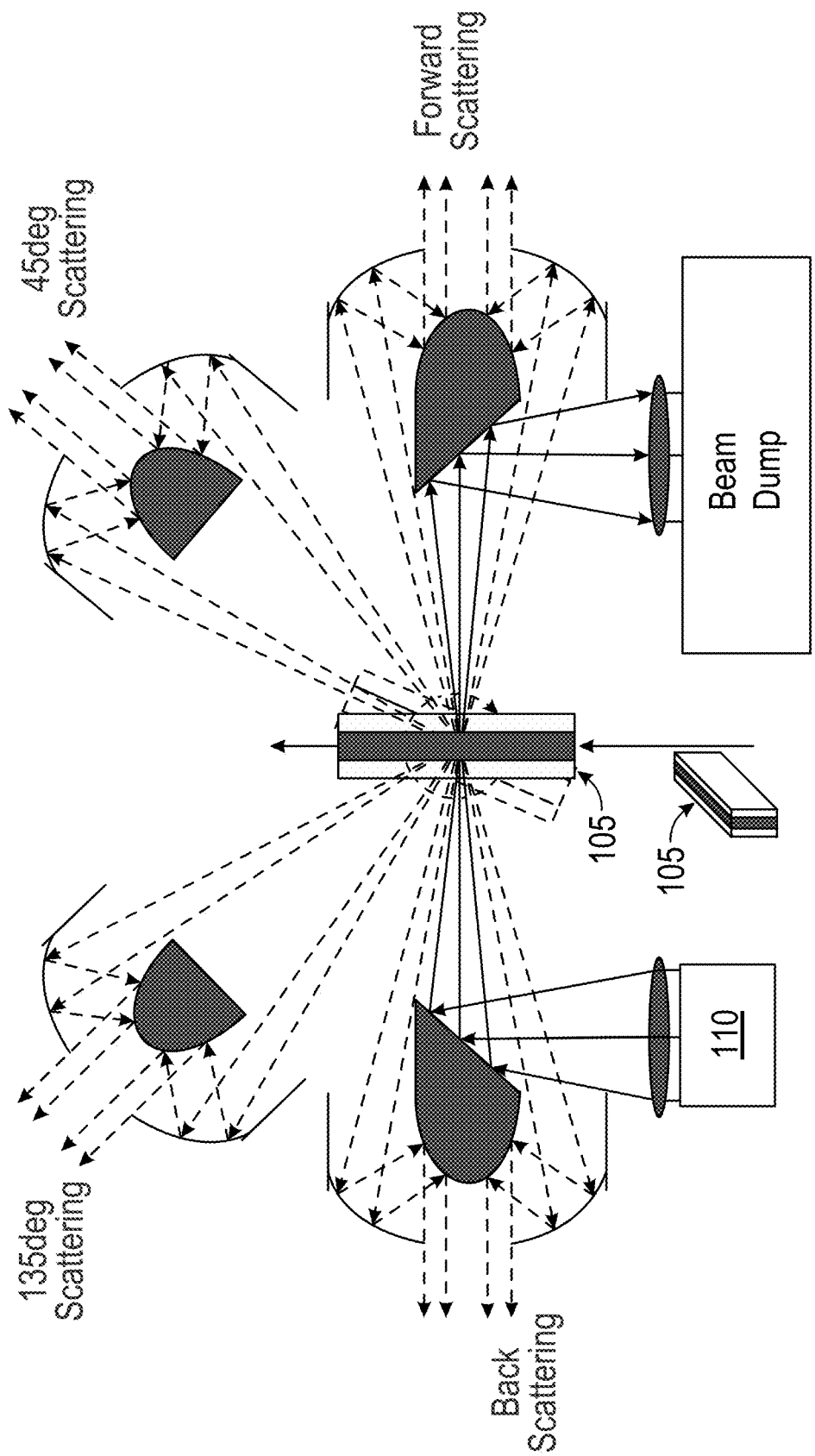
FIG. 2A is a schematic of multiple light scattering events at various angles, according to an embodiment of the present disclosure.
Figure 2B:
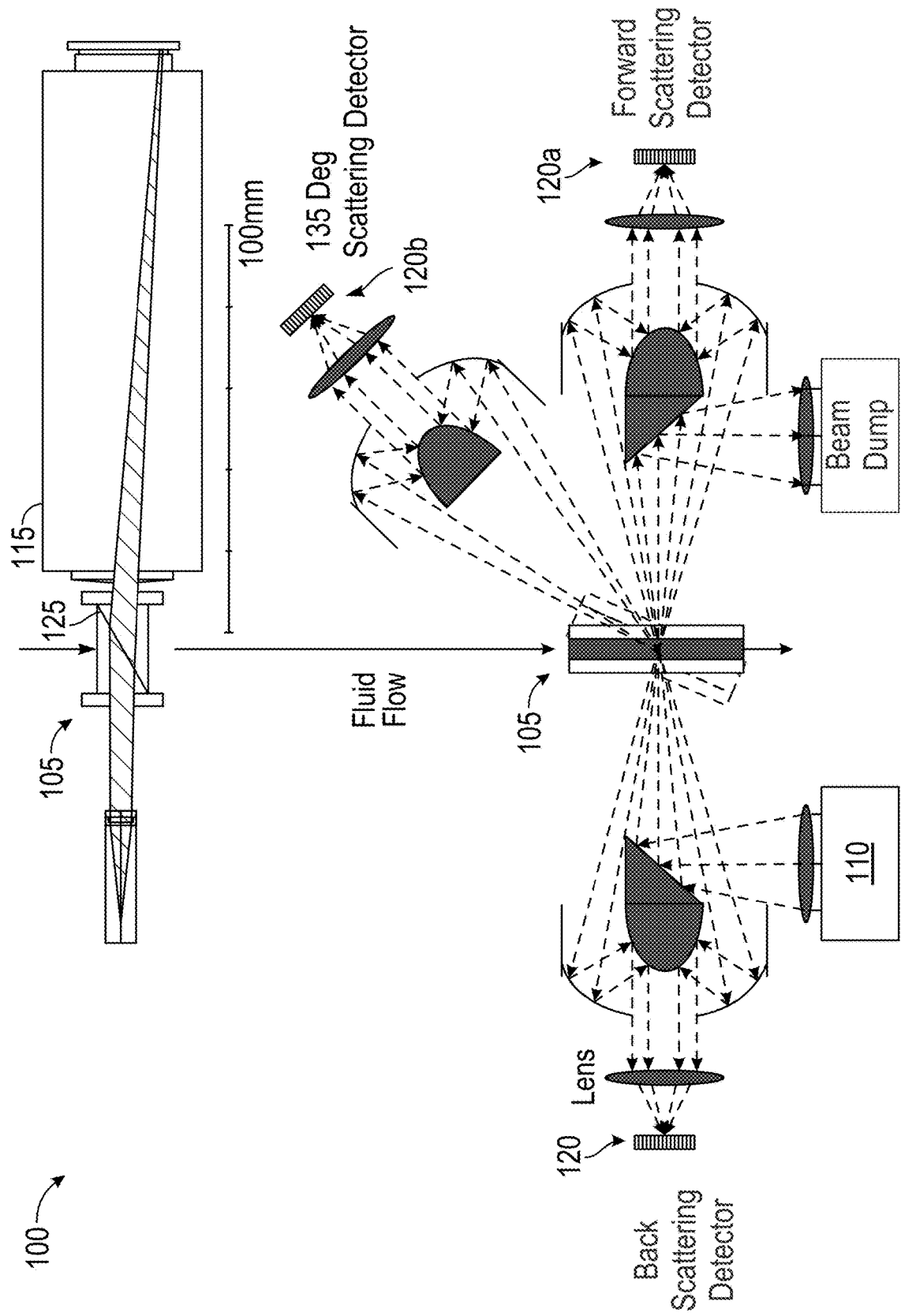
FIG. 2B is a schematic of multiple light sensors implemented in a monitoring apparatus, according to an embodiment of the present disclosure.

FIG. 2A is a schematic of multiple light scattering events at various angles, according to an embodiment of the present disclosure. FIG. 2B is a schematic of multiple light sensors implemented in the monitoring apparatus 100, according to an embodiment of the present disclosure. In an embodiment, side—(e.g. 45°, 90°, 135°, etc.) and front-scattered light may be collected by additional sensors (e.g. a second light sensor 120a, a third light sensor 120b, etc.) simultaneously as the first light sensor 120 using appropriate light-collecting optics for a multi-sensor setup, as shown. Alternatively, the first light sensor 120 can be re-oriented to the desired angular positions, for example using a moveable mount. As such, the first light sensor 120 can also be used to sequentially scan and collect signal over a range of desired scattering angles.

In order to collect the scattered light, the at least six flow cell sidewalls of the flow cell 105 can be cut and polished to optical quality. The at least six flow cell sidewalls of the flow cell 105 may include appropriate focusing lenses to facilitate collection of the scattered light.

The detected refractive index sensor 115 signal can be used to calculate the refractive index of the sample fluid. Initial calibration can include registering a position of the refracted line or the refracted spot (herein referred to as the "pixel position") on the refractive index sensor 115 for at least two reference samples, and then calculating a calibration function, which will convert the pixel position into an index of refraction value. For example, assuming linear dependence between the pixel position and the refractive index values, a total of two reference samples are sufficient. One can assume that samples with indices of refraction 'n1' and 'n2' correspond to pixel position 'p1' and 'p2'. Then, for an unknown sample, the index of refraction 'n' can be calculated from its pixel position 'p' by using equation:

$$n = \frac{p(n2 - n1) + p2n1 - p1n2}{(p2 - p1)}$$

A second-order polynomial dependence between the pixel position and the index of refraction can prompt measurements with three different samples, and so on.

Once the refractive index value is established, it can be converted into the concentration of, for example, the polymer in the solvent. Similarly, for pixel-to-refractive index conversions, a linear approximation can be used at the start.

Assuming the index of refraction 'n0' for the solvent (where concentration of the polymer c=0), and the index of refraction 'ns' for the reference solution with known concentration of the polymers c='cs', the concentration 'c' can be calculated from the measured index of refraction 'n' via equation:

$$c = cs \frac{(n - n0)}{(ns - n0)}$$

For higher order polynomials, exponentials, and other dependencies between the index of refraction and the concentration, the calibration equation can be modified accordingly.

As previously described, the first light sensor 120 can allow monitoring and measurement for both DLS and SLS simultaneously. The first light sensor 120 can include at least one of a photodiode, phototransistor, avalanche photodiode (APD), Geiger-mode operated APD also known as single-photon APD (SPAD), photo IC, photovoltaic device, photomultiplier tube (PMT), or another photosensitive detector capable of operating in photon-counting mode or another optical sensor suitable for DLS and/or SLS measurements. The DLS can be used for measurements of the polymer molecule hydrodynamic radius distribution, including average radius and spread of the distribution. This can include other variables for the calculation, such as viscosity, concentration (via the refractive index sensor 115), temperature, etc. that can be pre-measured or controlled for the DLS measurements. The SLS can be used for measurements of the polymer radius as well, but more specifically, the root mean square (RMS) radius, which is proportional to the molecular weight of the polymer. Combining the DLS and SLS can allow for measurement of the polymer molecule shape, weight distribution, average molecular weight and spread of the distribution. The DLS can process raw scattering signals-vs-time information, preferably but not necessarily collected in photon-counting mode, to generate an autocorrelation function, which can be fitted with, for example, an exponential function. From the fit, a decay constant can be calculated (see "*Dynamic Light Scattering: With Applications to Chemistry, Biology, and Physics*", Bruce J. Berne and Robert Pecora, Dover Publications (Dec. 20, 2013), ISBN-13: 978-0486788654). The SLS can average the intensity of the raw signal, for example to yield a time averaged fluctuating signal, to establish a scattering cross-section of the polymer in the test solvent. The fit of the autocorrelation function and the decay constant can then be used to determine the hydrodynamic radius of the polymer molecules.

Together the first light sensor 120 including both SLS and DLS channels can be used to estimate the molecular weight of the polymer molecules, providing both molecule size and weight information. In combination with concentration/refractive index measurements via the refractive index sensor 115, the fluid monitoring apparatus 100 can provide the capability to track changes in chemical composition of the polymer molecules, including incorrect concentration due to evaporation of solvents, events of polymerization, and changes in shape and weight of the polymer molecules.

Figure 3:
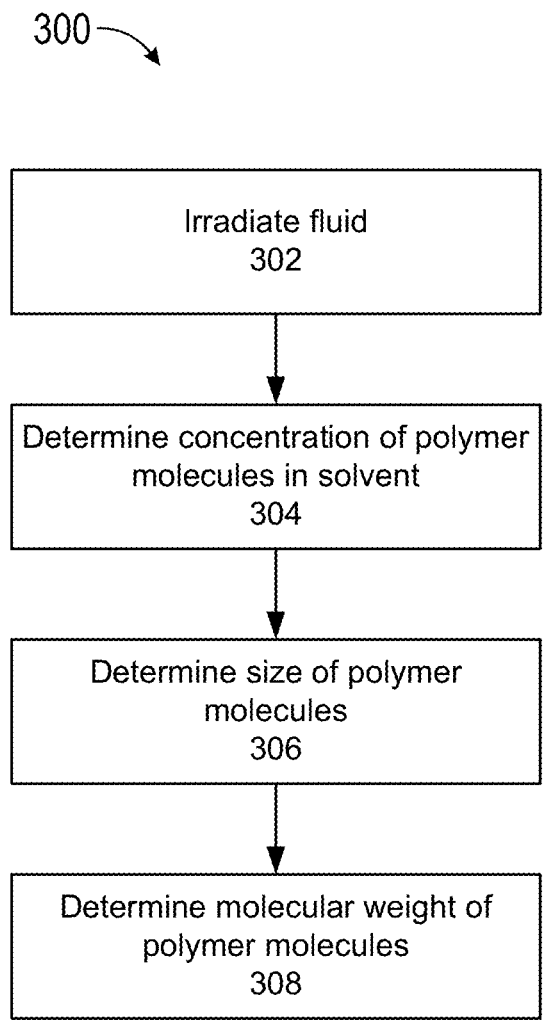
FIG. 3 is a flow chart for a method of monitoring a fluid, according to an embodiment of the present disclosure.

FIG. 3 is a flow chart for a method 300 of measuring properties of polymer molecules in a fluid, according to an embodiment of the present disclosure. In step 302, the fluid can be irradiated with light from the light source 110 as the fluid flows through the flow cell 105, for example via the first flow cell sidewall 105a of the at least six flow cell 105 sidewalls. In step 304, the concentration of the polymer molecules in the solvent of the fluid can be determined. As previously described, in one non-limiting example, the monitoring apparatus 100 can determine concentration of the polymer molecules in the solvent via the refractive index sensor 115. In step 306, the size of the polymer molecules can be determined. As previously described, in one non-limiting example, the monitoring apparatus 100 can determine the polymer molecule hydrodynamic radius distribution, including average radius (or more generally, the particle size) and the spread of the distribution of the polymer molecules in the solvent via the first light sensor 120. In step 308, the molecular weight of the polymer molecules can be determined. As previously described, in one non-limiting example, the monitoring apparatus 100 can also determine the polymer molecule weight distribution, including average molecular weight and spread of the distribution, via the first light sensor 120 when the first light sensor 120 includes a combined DLS and SLS sensor.

Figure 4:
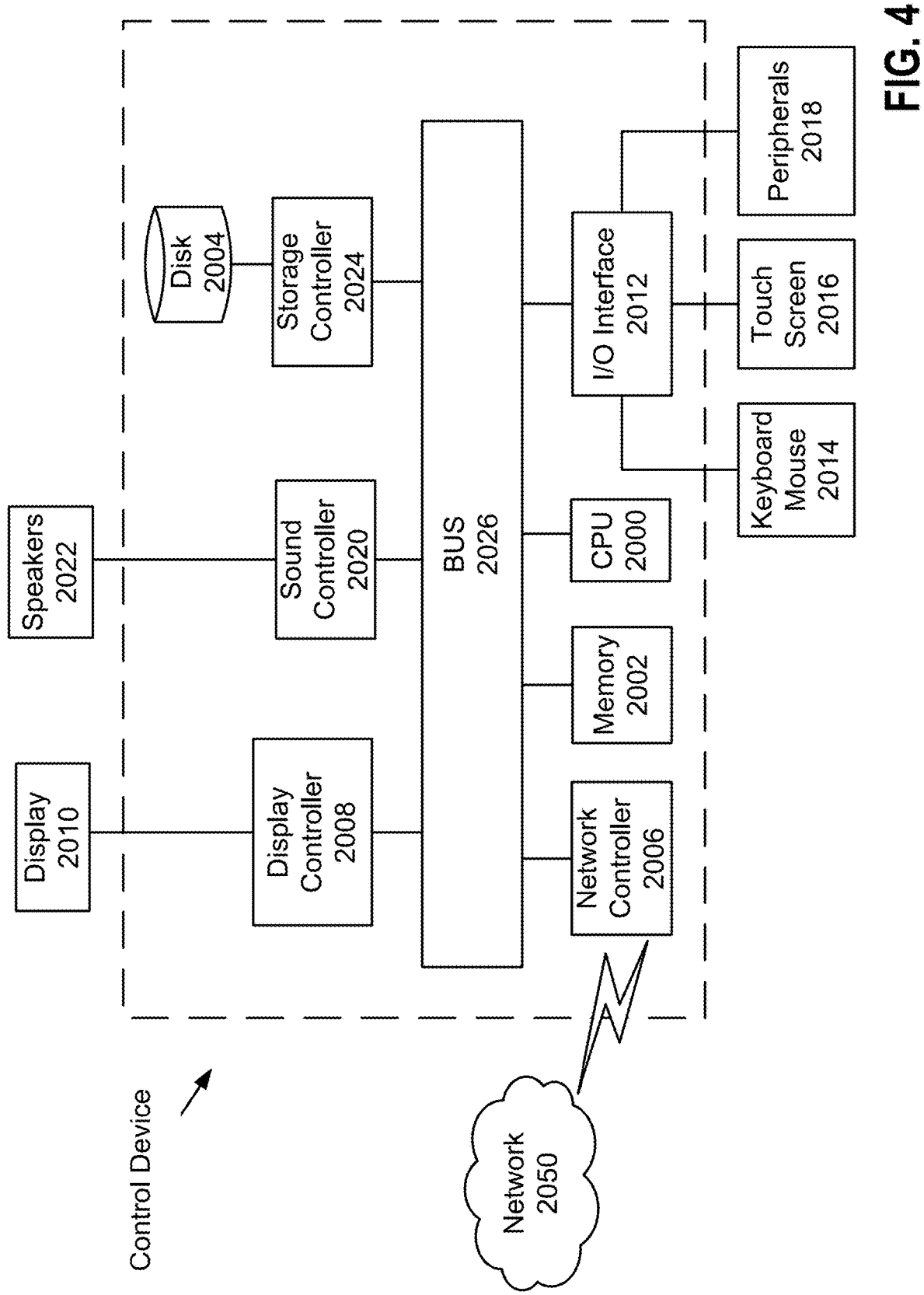
FIG. 4 is a hardware description of a computer for controlling the components of the system, according to an exemplary embodiment of the present disclosure.

Next, a hardware description of the control device according to exemplary embodiments is described with reference to FIG. 4. In FIG. 4, the control device includes a CPU 2000 which performs the processes described above. The process data and instructions may be stored in memory 2002. These processes and instructions may also be stored on a storage medium disk 2004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the control device communicates, such as a server or computer.

Further, the claimed advancements may be provided as a utility application, background daemon, or component of an operating system, or combination thereof, executing in conjunction with CPU 2000 and an operating system such as Microsoft Windows 10, UNIX, Solaris, LINUX, Apple MAC-OS and other systems known to those skilled in the art.

The hardware elements in order to achieve the control device may be realized by various circuitry elements, known to those skilled in the art. For example, CPU 2000 may be a Xenon or Core processor from Intel of America or an Opteron processor from AMD of America, or may be other processor types that would be recognized by one of ordinary skill in the art. Alternatively, the CPU 2000 may be implemented on an FPGA, ASIC, PLD or using discrete logic circuits, as one of ordinary skill in the art would recognize. Further, C P U 2000 may be implemented as multiple processors cooperatively working in parallel to perform the instructions of the inventive processes described above.

The control device in FIG. 4 also includes a network controller 2006, such as an Intel Ethernet PRO network interface card from Intel Corporation of America, for interfacing with network 2050. As can be appreciated, the network 2050 can be a public network, such as the Internet, or a private network such as an LAN or WAN network, or any combination thereof and can also include PSTN or ISDN sub-networks. The network 2050 can also be wired, such as an Ethernet network, or can be wireless such as a cellular network including EDGE, 3G and 4G wireless cellular systems. The wireless network can also be WiFi, Bluetooth, or any other wireless form of communication that is known.

The control device further includes a display controller 2008, such as a NVIDIA GeForce GTX or Quadro graphics adaptor from NVIDIA Corporation of America for interfacing with display 2010, such as a Hewlett Packard HPL2445w LCD monitor. A general purpose I/O interface 2012 interfaces with a keyboard and/or mouse 2014 as well as a touch screen panel 2016 on or separate from display 2010. General purpose I/O interface 2012 also connects to a variety of peripherals 2018 including any peripherals appropriate for electron microscopy.

A sound controller 2020 is also provided in the control device, such as Sound Blaster X-Fi Titanium from Creative, to interface with speakers/microphone 2022 thereby providing sounds and/or music.

The general purpose storage controller 2024 connects the storage medium disk 2004 with communication bus 2026, which may be an ISA, EISA, VESA, PCI, or similar, for interconnecting all of the components of the control device. A description of the general features and functionality of the display 2010, keyboard and/or mouse 2014, as well as the display controller 2008, storage controller 2024, network controller 2006, sound controller 2020, and general purpose I/O interface 2012 is omitted herein for brevity as these features are known.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "target substrate" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a layer on or overlying a base substrate structure such as a thin film. Thus, substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

Embodiments of the present disclosure may also be as set forth in the following parentheticals.

(1) An apparatus for measuring properties of polymer molecules in a fluid, comprising: a flow cell, including at least six flow cell sidewalls arranged in a cuboid shape and configured to receive a light beam from a first light source through a first flow cell sidewall of the at least six flow cell sidewalls, the light beam from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light beam from the first light source having a first predetermined wavelength; an inlet for receiving the fluid; an outlet for expelling the fluid; and a hollow chamber fluidly coupled to the inlet and the outlet, a first chamber sidewall bisecting the length of the flow cell, the first chamber sidewall having a predetermined angle to the incoming direction of the light beam from the first light source; a refractive index sensor configured to detect the light beam from the first light source transmitted through the hollow chamber of the flow cell and exiting the flow cell through the second flow cell sidewall of the at least six flow cell sidewalls; a first light sensor configured to detect the light beam from the first light source scattered off the fluid in the hollow chamber; and processing circuitry electrically connected to the refractive index and first light sensors.

(2) The apparatus of (1), wherein the fluid includes a mixture of the polymer molecules having a refractive index and a solvent having a refractive index; and the processing circuitry is configured to determine, based on the light beam detected at the refractive index sensor, a concentration of the polymer molecules in the solvent.

(3) The apparatus of (2), wherein the refractive index sensor is a differential refractometer, the light beam transmitted through the hollow chamber being scattered by the first chamber sidewall based on the polymer molecules refractive index and the solvent refractive index, the scattered light beam having a first scatter angle; and the processing circuitry is configured to determine, based on the first scatter angle, a first refractive index of the fluid.

(4) The apparatus of any one of (1) to (3), wherein the fluid includes polymer molecules having a size; and the processing circuitry is configured to determine, based on the light beam detected at the first light sensor, the size of the polymer molecules in the fluid.

(5) The apparatus of (4), wherein the light beam scattering off the polymer molecules in the fluid produce a fluctuating signal detected by the first light sensor, and the processing circuitry is configured to determine, based on a time averaged fluctuating signal, the size of the polymer molecules in the fluid.

(6) The apparatus of any one of (1) to (5), wherein the fluid includes polymer molecules having a molecular weight; and the processing circuitry is configured to determine, based on the light beam detected at the first light sensor, the molecular weight of the polymer molecules in the fluid.

(7) The apparatus of (6), wherein the light beam scattering off the polymer molecules in the fluid has a signal intensity detected by the first light sensor, and the processing circuitry is configured to determine, based on a time averaged signal intensity, the molecular weight of the polymer molecules in the fluid.

(8) The apparatus of any one of (1) to (7), further comprising: a second light sensor configured to detect the light beam from the first light source scattered off the fluid in the hollow chamber, wherein the first light sensor is disposed along a substantially back scatter direction and configured to detect a back scattered light beam from the first light source scattered off the fluid in the hollow chamber, and the second light sensor is disposed along a forward scatter direction and configured to detect a forward scattered light beam from the first light source scattered off the fluid in the hollow chamber.

(9) The apparatus of any one of (1) to (8), further comprising: a third light sensor configured to detect the light beam from the first light source scattered off the fluid in the hollow chamber, wherein the first light sensor is disposed along a back scatter direction and configured to detect a back scattered light beam from the first light source scattered off the fluid in the hollow chamber, and the third light sensor is disposed along an off-axis scatter direction and configured to detect an off-axis scattered light beam from the first light source scattered off the fluid in the hollow chamber.

(10) The apparatus of any one of (1) to (9), wherein the first light sensor includes at least one of a photodiode, photomultiplier, or a solid state direct electron detector.

(11) The apparatus of any one of (1) to (10), wherein a material of the flow cell has a refractive index, the flow cell material refractive index being similar to that of the first refractive index of the fluid.

(12) The apparatus of any one of (1) to (11), wherein a material of the flow cell has a refractive index, the flow cell material refractive index being between approximately 1.35 to approximately 1.5.

(13) The apparatus of any one of (1) to (12), wherein a material of the flow cell is one of quartz or fused silica.

(14) The apparatus of any one of (1) to (13), wherein the light source is monochromatic.

(15) The apparatus of any one of (1) to (14), wherein the light source is at least one of LASER, LED, fiber-based tunable laser, tungsten halogen, deuterium, xenon, argon, mercury bulb, and LDLS (laser-driven light source).

(16) The apparatus of any one of (1) to (15), wherein the predetermined angle is selected to maximize the sensitivity of the light beam to changes of index of refraction, to prevent internal reflections, or both.

(17) The apparatus of any one of (1) to (16), wherein the predetermined angle is between approximately 15 to approximately 75 degrees.

(18) A semiconductor processing system for applying a fluid to a substrate, comprising: at least one fabrication module including a coating apparatus, a developing apparatus, and a fluid monitoring apparatus, the fluid monitoring apparatus including a flow cell, including at least six flow cell sidewalls arranged in a cuboid shape and configured to receive a light beam from a first light source at an orthogonal angle through a first flow cell sidewall of the at least six flow cell sidewalls, the light beam from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light beam from the first light source having a first predetermined wavelength; an inlet for receiving the fluid; an outlet for expelling the fluid; and a hollow chamber fluidly coupled to the inlet and the outlet, a first chamber sidewall bisecting the length of the flow cell, the first chamber sidewall having a predetermined angle to the incoming direction of the light beam from the first light source; a refractive index sensor configured to detect the light beam from the first light source transmitted through the hollow chamber of the flow cell and exiting the flow cell through the second flow cell sidewall of the at least six flow cell sidewalls; a first light sensor configured to detect the light beam from the first light source scattered off the fluid in the hollow chamber; and processing circuitry electrically connected to the refractive index and first light sensors.

(19) A method for measuring properties of polymer molecules in a fluid, comprising: irradiating the fluid flowing through a flow cell with a light beam, the flow cell including at least six flow cell sidewalls arranged in a cuboid shape and configured to receive the light beam from a first light source at an orthogonal angle through a first flow cell sidewall of the at least six flow cell sidewalls, the light beam from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light beam from the first light source having a first predetermined wavelength, an inlet for receiving the fluid, an outlet for expelling the fluid, and a hollow chamber fluidly coupled to the inlet and the outlet, a first chamber sidewall bisecting the length of the flow cell, the first chamber sidewall having a predetermined angle to the incoming direction of the light beam from the first light source; determining, via processing circuitry and a refractive index sensor configured to detect the light beam from the first light source transmitted through the hollow chamber of the flow cell and exiting the flow cell through the second flow cell sidewall of the at least six flow cell sidewalls, a concentration of the polymer molecules in a solvent of the fluid, the fluid including a mixture of the polymer molecules having a refractive index and the solvent having a refractive index; and determining, via the processing circuitry and a first light sensor configured to detect the light beam from the first light source scattered off the fluid in the hollow chamber, a size of polymer molecules in the fluid.

(20) The method of (19), further comprising: determining, based on the refractive index sensor being a differential refractometer configured to detect the light beam transmitted through the hollow chamber and scattered by the first chamber sidewall having a first scatter angle, a first refractive index of the fluid.

(21) The method of either (19) or (20), further comprising: upon determining the concentration of the polymer is above a predetermined threshold, removing the fluid.

(21) The method of either (19) or (20), further comprising: upon determining the first refractive index is above a predetermined threshold, removing the fluid.

(22) The method of either (19) or (20), further comprising: determining, based on the light beam detected at the first light sensor, a size of polymer molecules in the fluid.

(23) The method of either (19) or (20), further comprising: determining, based on a time averaged fluctuating signal of the light beam scattered off the polymer molecules in the fluid and detected by the first light sensor, the size of the polymer molecules in the fluid.

(24) The method of either (19) or (20), further comprising: determining, based on the light beam detected at the first light sensor, a molecular weight of the polymer molecules in the fluid.

(25) The method of any one of (19) to (24), wherein the hollow chamber includes a right triangular cross section spanning a length of the flow cell.

(26) The method of any one of (19) to (25), wherein the fluid is one of photoresist, anti-reflective coating, spin-on-carbon, developer, etching fluid, cleaning fluid, or spin-on-dielectric.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An apparatus for measuring properties of polymer molecules in a fluid, comprising:
a flow cell, including
at least six flow cell sidewalls arranged in a cuboid shape and configured to receive a light beam from a first light source at an orthogonal angle through a first flow cell sidewall of the at least six flow cell sidewalls, the light beam from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light beam from the first light source having a first predetermined wavelength;
an inlet for receiving the fluid;
an outlet for expelling the fluid; and
a hollow chamber fluidly coupled to the inlet and the outlet, a first chamber sidewall bisecting the length of the flow cell, the first chamber sidewall having a predetermined angle to the incoming direction of the light beam from the first light source;
a refractive index sensor configured to detect the light beam from the first light source transmitted through the hollow chamber of the flow cell and exiting the flow cell through the second flow cell sidewall of the at least six flow cell sidewalls;
a first light sensor configured to detect the light beam from the first light source scattered off the fluid in the hollow chamber; and
processing circuitry electrically connected to the refractive index and first light sensors.

2. The apparatus of claim 1, wherein
the fluid includes a mixture of the polymer molecules having a refractive index and a solvent having a refractive index; and
the processing circuitry is configured to determine, based on the light beam detected at the refractive index sensor, a concentration of the polymer molecules in the solvent.

3. The apparatus of claim 2, wherein
the refractive index sensor is a differential refractometer, the light beam transmitted through the hollow chamber being scattered by the first chamber sidewall based on the polymer molecules refractive index and the solvent refractive index, the scattered light beam having a first scatter angle; and
the processing circuitry is configured to determine, based on the first scatter angle, a first refractive index of the fluid.

4. The apparatus of claim 1, wherein
the fluid includes polymer molecules having a size; and
the processing circuitry is configured to determine, based on the light beam detected at the first light sensor, the size of the polymer molecules in the fluid.

5. The apparatus of claim 4, wherein
the light beam scattered off the polymer molecules in the fluid produce a fluctuating signal detected by the first light sensor, and
the processing circuitry is configured to determine, based on a time averaged fluctuating signal, the size of the polymer molecules in the fluid.

6. The apparatus of claim 1, wherein
the fluid includes polymer molecules having a molecular weight; and
the processing circuitry is configured to determine, based on the light beam detected at the first light sensor, the molecular weight of the polymer molecules in the fluid.

7. The apparatus of claim 6, wherein
the light beam scattering off the polymer molecules in the fluid has a signal intensity detected by the first light sensor, and the processing circuitry is configured to determine, based on a time averaged signal intensity, the molecular weight of the polymer molecules in the fluid.

8. The apparatus of claim 1, further comprising:
a second light sensor configured to detect the light beam from the first light source scattered off the fluid in the hollow chamber, wherein
the first light sensor is disposed along a substantially back scatter direction and configured to detect a back scattered light beam from the first light source scattered off the fluid in the hollow chamber, and
the second light sensor is disposed along a forward scatter direction and configured to detect a forward scattered light beam from the first light source scattered off the fluid in the hollow chamber.

9. The apparatus of claim 1, further comprising:
a third light sensor configured to detect the light beam from the first light source scattered off the fluid in the hollow chamber, wherein
the first light sensor is disposed along a back scatter direction and configured to detect a back scattered light beam from the first light source scattered off the fluid in the hollow chamber, and
the third light sensor is disposed along an off-axis scatter direction and configured to detect an off-axis scattered light beam from the first light source scattered off the fluid in the hollow chamber.

10. The apparatus of claim 1, wherein the first light sensor includes at least one of a photodiode, photomultiplier, or a solid state direct electron detector.

11. The apparatus of claim 1, wherein a material of the flow cell has a refractive index, the flow cell material refractive index being similar to that of the first refractive index of the fluid.

12. The apparatus of claim 1, wherein a material of the flow cell has a refractive index, the flow cell material refractive index being between approximately 1.35 to approximately 1.5.

13. The apparatus of claim 1, wherein a material of the flow cell is one of quartz or fused silica.

14. The apparatus of claim 1, wherein the light source is monochromatic.

15. The apparatus of claim 1, wherein the light source is at least one of LASER, LED, fiber-based tunable laser, tungsten halogen, deuterium, xenon, argon, mercury bulb, and LDLS (laser-driven light source).

16. The apparatus of claim 1, wherein the predetermined angle is selected to maximize the sensitivity of the light beam to changes of index of refraction, to prevent internal reflections, or both.

17. The apparatus of claim 1, wherein the predetermined angle is between approximately 15 to approximately 75 degrees.

18. A semiconductor processing system for applying a fluid to a substrate, comprising:
at least one fabrication module including a coating apparatus, a developing apparatus, and a fluid monitoring apparatus, the fluid monitoring apparatus including
a flow cell, including
at least six flow cell sidewalls arranged in a cuboid shape and configured to receive a light beam from a first light source at an orthogonal angle through a first flow cell sidewall of the at least six flow cell sidewalls, the light beam from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light beam from the first light source having a first predetermined wavelength;
an inlet for receiving the fluid;
an outlet for expelling the fluid; and
a hollow chamber fluidly coupled to the inlet and the outlet,
a first chamber sidewall bisecting the length of the flow cell, the first chamber sidewall having a predetermined angle to the incoming direction of the light beam from the first light source;
a refractive index sensor configured to detect the light beam from the first light source transmitted through the hollow chamber of the flow cell and exiting the flow cell through the second flow cell sidewall of the at least six flow cell sidewalls;
a first light sensor configured to detect the light beam from the first light source scattered off the fluid in the hollow chamber; and
processing circuitry electrically connected to the refractive index and first light sensors.

19. A method for measuring properties of polymer molecules in a fluid, comprising:
irradiating the fluid flowing through a flow cell with a light beam, the flow cell including at least six flow cell sidewalls arranged in a cuboid shape and configured to receive the light beam from a first light source at an orthogonal angle through a first flow cell sidewall of the at least six flow cell sidewalls, the light beam from the first light source exiting the flow cell through a second flow cell sidewall of the at least six flow cell sidewalls, the second flow cell sidewall of the at least six flow cell sidewalls being disposed opposite and parallel to the first flow cell sidewall of the at least six flow cell sidewalls, the light beam from the first light source having a first predetermined wavelength, an inlet for receiving the fluid, an outlet for expelling the fluid, and a hollow chamber fluidly coupled to the inlet and the outlet, a first chamber sidewall bisecting the length of the flow cell, the first chamber sidewall having a predetermined angle to the incoming direction of the light beam from the first light source;
determining, via processing circuitry and a refractive index sensor configured to detect the light beam from the first light source transmitted through the hollow chamber of the flow cell and exiting the flow cell through the second flow cell sidewall of the at least six flow cell sidewalls, a concentration of the polymer molecules in a solvent of the fluid, the fluid including a mixture of the polymer molecules having a refractive index and the solvent having a refractive index; and
determining, via the processing circuitry and a first light sensor configured to detect the light beam from the first light source scattered off the fluid in the hollow chamber, a size of polymer molecules in the fluid.

20. The method of claim 19, further comprising:
determining, based on the refractive index sensor being a differential refractometer configured to detect the light beam transmitted through the hollow chamber and scattered by the first chamber sidewall having a first scatter angle, a first refractive index of the fluid.

* * * * *